(12) United States Patent
Collins et al.

(10) Patent No.: US 9,159,115 B1
(45) Date of Patent: Oct. 13, 2015

(54) PROCESSING VECTORIZED ELEMENTS ASSOCIATED WITH IT SYSTEM IMAGES (71) Applicant: EMC Corporation, Hopkinton, MA (US)

(72) Inventors: Daniel S. Collins, San Francisco, CA (US); Russell R. Laporte, Webster, MA (US)

(73) Assignee: EMC Corporation, Hopkinton, MA (US)

( * ) Notice: Subject to any disclaimer, the term of this patent is extended or adjusted under 35 U.S.C. 154(b) by 16 days.

(21) Appl. No.: 14/042,688

(22) Filed: Sep. 30, 2013

(51) Int. Cl.
*G06T 3/20* (2006.01)

(52) U.S. Cl.
CPC .......................................... *G06T 3/20* (2013.01)

(58) Field of Classification Search
CPC .................................... G06K 9/00; G06T 3/20
USPC .......................................................... 382/194
See application file for complete search history.

(56) References Cited

U.S. PATENT DOCUMENTS

| | | | |
|---|---|---|---|
| 6,711,293 B1* | 3/2004 | Lowe | 382/219 |
| 8,253,684 B1* | 8/2012 | Lloyd | 345/156 |
| 2005/0088426 A1* | 4/2005 | Smirnov et al. | 345/179 |
| 2006/0197928 A1* | 9/2006 | Hirai | 355/30 |
| 2006/0242349 A1* | 10/2006 | Ewanchuk et al. | 710/305 |
| 2006/0274057 A1* | 12/2006 | Van Ness et al. | 345/179 |
| 2009/0161930 A1* | 6/2009 | Zahniser | 382/128 |
| 2009/0207141 A1* | 8/2009 | Dubs et al. | 345/173 |
| 2010/0070854 A1* | 3/2010 | Kashibuchi et al. | 715/255 |
| 2010/0098339 A1* | 4/2010 | Kido | 382/199 |
| 2011/0234840 A1* | 9/2011 | Klefenz et al. | 348/222.1 |
| 2012/0308138 A1* | 12/2012 | Bellegarda et al. | 382/181 |
| 2013/0055083 A1* | 2/2013 | Fino | 715/716 |
| 2014/0172361 A1* | 6/2014 | Chiang et al. | 702/160 |

* cited by examiner

*Primary Examiner* — Barry Drennan
*Assistant Examiner* — Delomia Gilliard
(74) *Attorney, Agent, or Firm* — John T. Hurley; Jason A. Reyes; Krishnendu Gupta (57) ABSTRACT

There is disclosed a technique for use in processing vectorized elements on a mobile computing device. A vector list is received, wherein the list comprises a set of vectors having positional and magnitude values associated with identified markers. A first test angle and stride size is determined. Vectors falling within a boundary defined by the first test angle and first stride size are analyzed and a likelihood the vectors form a line is determined. An increment size is adjusted if a positive determination result occurs. Vectors that intersect with a line are identified, wherein the vectors include vectors determined to fall with the boundary defined by the first test angle and first stride size. Based on a first policy, vectors that intersect the line are identified. A report including anchor information associated with the identified vectors is created.

2 Claims, 6 Drawing Sheets

PROCESSING VECTORIZED ELEMENTS ASSOCIATED WITH IT SYSTEM IMAGES

BACKGROUND

1. Technical Field

This application relates generally to processing vectorized elements associated with information technology (IT) system components.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Computers, computer networks, and other computer-based systems are becoming increasingly important as part of the infrastructure of everyday life. Networks are used for sharing peripherals and files. In such systems, complex components are the most common sources of failure or instability. The proliferation of multiple interacting components leads to problems that are difficult or impossible to predict or prevent. The problems are compounded by the use of networks, which introduce the added complexity of multiple machines interacting in obscure and unforeseen ways.

Additionally, the need for high performance, high capacity IT systems is driven by several factors. In many industries, critical IT applications require outstanding levels of service. At the same time, the world is experiencing an information explosion as more and more users demand timely access to a huge and steadily growing mass of data including high quality multimedia content. The users also demand that information technology solutions protect data and perform under harsh conditions with minimal data loss and minimum data unavailability. Computing systems of all types are not only accommodating more data but are also becoming more and more interconnected, raising the amounts of data exchanged at a geometric rate.

To address this demand, modern data storage systems ("storage systems") are put to a variety of commercial uses. For example, they are coupled with host systems to store data for purposes of product development, and large storage systems are used by financial institutions to store critical data in large databases. For many uses to which such storage systems are put, it is highly important that they be highly reliable so that critical data is not lost or unavailable.

It will be appreciated that different tasks may be performed in connection with data storage systems. For example, software may be executed on the data storage systems in connection with performing data storage administration tasks such as for data storage configuration, management, and/or monitoring. The monitoring of data storage systems may include analyzing the health of the data storage system and investigating the cause of a failure in the data storage system when the data storage system fails to function successfully. The monitoring of the data storage system may be performed by services such as a data collection service, a configuration service and a performance analyzer service. For example, the data collection service may gather logs of the storage system ("system logs"), snapshots of the data storage system's memory, configuration and status information of the data storage system. It will be appreciated in case of a failure in such storage systems, it is useful that the information is investigated in a timely manner for preventing further failures in such storage systems.

However, it is also useful that potential problems in connection with data storage systems are identified before a failure or crisis situation arises. If a crisis situation is left to develop it may be too late to rectify the problem in the data storage system without causing disruption and inconvenience to the users of the data storage system.

In many organizations (e.g., companies), it is common to store equipment in racks, which typically house several components on different shelves therein. By storing components in racks, an organization can organize and optimize space utilization. The optimization and organization of space can be very important if the equipment must be stored under particular environmental conditions, such as low humidity and/or low temperature conditions. Under those conditions, a special room is usually dedicated to housing such environmentally sensitive equipment. In any event, it is not uncommon to have a room filled with multiple racks, each storing several components.

Keeping track of the location of each component can be a daunting, but necessary, task. If the organization desires to reconfigure its network, or if a particular component, such as a server, sends out an alert that a hardware component is about to fail, a system administrator must be able to locate the components quickly. System management software is available to help the system administrator monitor computer components such as servers, storage devices, and network routers, and to warn the system administrator if and when intervention is required for a particular component. For example, intervention would be necessary for environmental concerns (such as elevated temperatures in a portion of the equipment), hardware failures, and performance issues. System alerts can also include warnings of potential problems so that the system administrator can take preventive measures to avoid a catastrophic failure.

Typical system management software applications include a system management console program and a system management agent. The console program typically resides on the system administrator's workstation, and the management agent resides on the managed components. The system administrator is able to monitor each component through the cooperation between the console program and the management agent. The utility of such programs can be limited if the system administrator cannot identify the physical location of a component, particularly if the component is one of several hundred, or mounted in a rack that is in a room with dozens of other similar racks.

Systems for creating three-dimensional models of objects such as buildings are known in the art. Such systems allow the user to place features such as floors, ceilings, exterior walls, interior walls, doors, windows, columns or other support structures, and other suitable features in desired locations so as to create a three-dimensional model of a building or other suitable object. In addition, such systems allow a user to create views of the building or other object, such as to view the building or other object from a different perspective, to make a cut-away view through the object, or to otherwise change the view of the model.

Recent developments in integration technology have opened the way for the spread of various portable devices such as mobile phones and tablet computers that provide a variety of functions such as a digital camera function.

SUMMARY OF THE INVENTION

There is disclosed a technique for use in processing vectorized elements on a mobile computing device. A vector list is received, wherein the list comprises a set of vectors having positional and magnitude values associated with identified markers. A first test angle and stride size is determined. Vectors falling within a boundary defined by the first test angle and first stride size are analyzed and a likelihood the vectors form a line is determined. An increment size is adjusted if a positive determination result occurs. Vectors that intersect with a line are identified, wherein the vectors include vectors determined to fall with the boundary defined by the first test angle and first stride size. Based on a first policy, vectors that intersect the line are identified. A report including anchor information associated with the identified vectors is created.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

In its conventional form, a Hough transform is performed on a bitmap image where candidate lines are generated for each permutation of specified slopes and positions. Each pixel the candidate line intercepts is analyzed to determine if it is significantly different from its neighboring pixels. If enough qualifying pixels intercept a candidate line, it is assumed that an actual line exists at this position in the image. Techniques described herein improve upon existing techniques by using a smaller set of vector elements so that the analysis of each individual pixel is not necessary. These techniques provides a way to pre-qualify subsections of the image for potential candidate lines so that performing a Hough transform over an entire image may not be necessary, thereby significantly improving processing speed.

Figure 1:
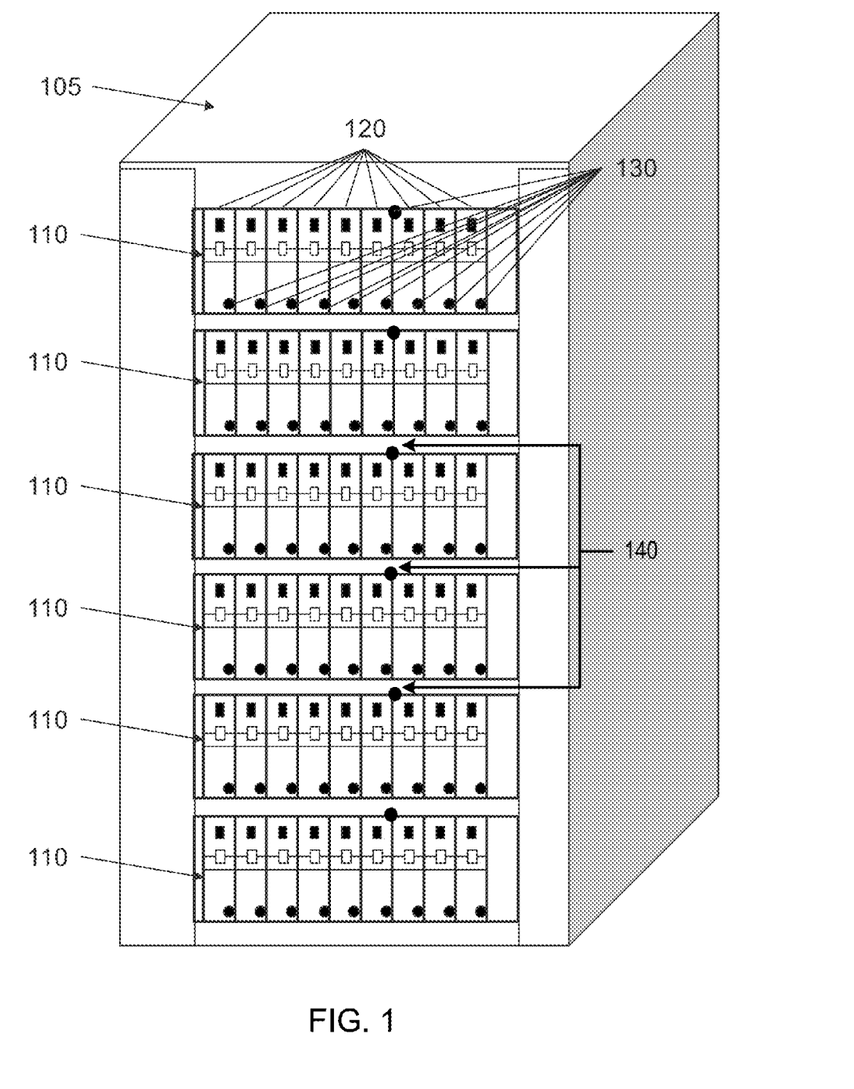
FIG. 1 is an example embodiment of a system that may utilize the techniques described herein.

FIG. 1 illustrates a data storage system comprising components having markers, such as light emitting diodes (LED) that may be used to identify the location of one or more storage system components within the data storage system. As illustrated, rack 105 contains IT components including disk enclosures 110. Disk enclosures 110 contain hard disk and/or solid state drives 120 (collectively disk drives). The disk enclosures 110 and/or disk drives 120 include LEDs 130. Other components may be included within the data storage system, including servers, networking equipment, power supplies and the like and such equipment may include LEDs 140 that may, but need not, be a different color as the disk drives' LEDs 130 and may be located in a different Y-axis that the disk drives' LEDs 130. The other equipment LEDs 140 may be located behind the disk drives enclosures 110 but still visible when viewing the front of the rack 105 (i.e., the side where the disk enclosure/drives 110, 120 are installed.

As illustrated in FIG. 1, each of disk enclosures 110 and/or disk drives have one or more LEDs 130 arranged on their face. As discussed above, the arrangement of LEDs 130 can be used to identify the type of IT equipment in an image (e.g., distinguish between disk enclosures 110 and other IT components, such as servers and power supplies, based on the arrangement of the LEDs 130). In some applications, the arrangement of LEDs 130 can be used to determine the position of IT equipment in an image (e.g., determine the position of disk enclosures 110 based on the location and arrangement of LEDs 130 associated with disk enclosure 110).

Figure 2:
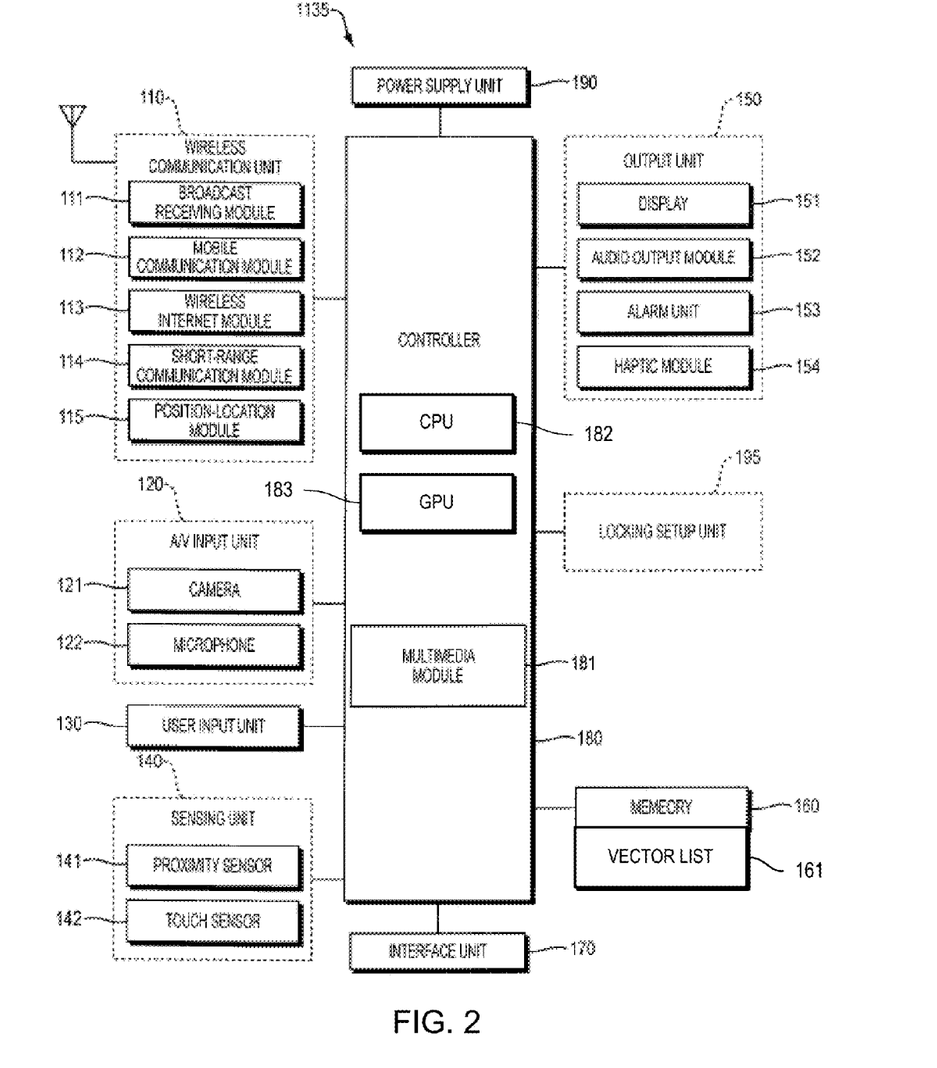
FIG. 2 is a block diagram of an example device that may be used with the techniques described herein.

FIG. 2 is a block diagram of device 1135 according to one example embodiment. Other embodiments, arrangements and configurations may also be provided.

As shown in FIG. 2, device 1135 may include a wireless communication unit 110, an A/V (audio/video) input unit 120, a user input unit 130, a sensing unit 140, an output unit 150 having a display 151, a memory 160, an interface unit 170, a controller 180, a power supply unit 190, a locking set-up unit 195 and the like. FIG. 2 shows device 1135 having various components, although all the illustrated components are not a requirement. Greater or fewer components may alternatively be implemented.

Wireless communication unit 110 may include one or more components that permit wireless communication between the device 1135 and a wireless communication system or network within which device 1135 is located. For example, the wireless communication unit 110 may include a broadcast receiving module 111, a mobile communication module 112, a wireless Internet module 113, a short-range communication module 114, a position-location module 115 and/or the like. The broadcast receiving module 111 may receive a broadcast signal and/or broadcast associated information from an external broadcast managing server via a broadcast channel, and the broadcast signal and/or broadcast associated information received by the broadcast receiving module 111 may be stored in a suitable device, such as the memory 160.

The mobile communication module 112 transmits/receives wireless signals to/from one or more network entities (e.g., base station, external terminal, server, etc.). Such wireless signals may represent audio, video, and data signals according to text/multimedia message transceivings, among others.

The wireless Internet module 113 supports Internet access for the device 1135. This module may be internally or externally coupled to the device 1135. In this case, the wireless Internet technology can include WLAN (Wireless LAN) (Wi-Fi), Wibro (Wireless broadband), Wimax (World Interoperability for Microwave Access), HSDPA (High Speed Downlink Packet Access), etc.

The short-range communication module 114 may facilitate relatively short-range communications. Suitable technologies for implementing this module include radio frequency identification (RFID), infrared data association (IrDA), ultra-wideband (UWB), as well as the networking technologies commonly referred to as Bluetooth and ZigBee, to name a few.

The position-location module 115 may identify or otherwise obtain the location or position of the device 1135. This module may be implemented with a global positioning system (GPS) module.

The audio/video (A/V) input unit 120 may provide audio or video signal inputs to the device 1135. The A/V input unit 120 may include a camera 121 and a microphone 122. The camera 121 may receive and process image frames of still pictures or video that are obtained by an image sensor in a video call mode or a photographing mode. The processed image frames may be displayed on the display 151.

The image frames processed by the camera 121 may be stored in the memory 160 or may be externally transmitted via the wireless communication unit 110. At least two cameras 121 may be provided to the device 1135 based on environment of usage.

The microphone 122 may receive an external audio signal while the device 1135 is in a particular mode, such as phone call mode, a recording mode and/or a voice recognition mode. The audio signal may be processed and converted into electric audio data. The processed audio data may be transformed into a format transmittable to a mobile communication base station via the mobile communication module 112 in case of a call mode. The microphone 122 may include noise removing algorithms (or noise canceling algorithms) to remove or reduce noise generated in the course of receiving the external audio signal.

The user input unit 130 may generate input data responsive to user manipulation of an associated input device or devices. Examples of such devices may include a keypad, a dome switch, a touchpad (e.g., static pressure/capacitance), a jog wheel, a jog switch, etc.

The sensing unit 140 may provide sensing signals for controlling operations of the device 1135 using status measurements of various aspects of the device 1135. For example, the sensing unit 140 may detect an open/close status of the device 1135, relative positioning of components (e.g., a display and a keypad) of the device 1135, a position change of the device 1135 or a component of the device 1135, a presence or an absence of user contact with the device 1135, orientation or acceleration/deceleration of the device 1135. As an example, the device 1135 may be configured as a slide-type mobile terminal. The sensing unit 140 may sense whether a sliding portion of the device 1135 is open or closed. Other examples include the sensing unit 140 sensing presence or absence of power provided by the power supply 190, presence or absence of a coupling or other connection between the interface unit 170 and an external device. The sensing unit 140 may include a proximity sensor 141 and a touch sensor 142.

The output unit 150 may generate outputs relevant to senses of sight, hearing, touch and the like. The output unit 150 may include the display 151, an audio output module 152, an alarm 153 and a haptic module 154.

The display 151 may visually display (i.e., output) information associated with the device 1135. For example, if the device 1135 is operated in a phone call mode, the display 151 may provide a user interface (UI) or a graphical user interface (GUI) that includes information associated with placing, conducting, and/or terminating a phone call. If the device 1135 is in a video call mode or a photographing mode, the display 151 may additionally or alternatively display images that are associated with these modes, the UI or the GUI.

The display 151 may be implemented using known display technologies including, for example, a liquid crystal display (LCD), a thin film transistor-liquid crystal display (TFT-LCD), an organic light-emitting diode display (OLED), a flexible display and a three-dimensional (3-D) display. The device 1135 may include one or more of such displays.

Some of the displays may be implemented in a transparent or optical transmittive type that can be called a transparent display. A transparent OLED (or TOLED) may be an example of the transparent display. The display 151 may also be implemented as the optical transmittive type. In this configuration, a user may see an object in rear of a terminal body via an area occupied by the display 151 of the terminal body.

At least two displays 151 may be provided on the device 1135 based on the configuration of the device 1135. For example, a plurality of displays may be arranged on a single face of the device 1135 by being spaced apart from each other or by being built in one body. A plurality of displays may be arranged on different faces of the device 1135.

In a case that the display 151 and the touch sensor 141 for detecting a touch action are configured in a mutual layer structure (hereafter called a touch screen), the display 151 may be used as an input device as well as an output device. The touch sensor 142 may be configured as a touch film, a touch sheet, a touchpad and/or the like.

The touch sensor 142 may convert a pressure applied to a specific portion of the display 151 or a variation of a capacitance generated from a specific portion of the display 151 to an electric input signal. The touch sensor 142 may detect a pressure of a touch as well as a touched position or size. A separate pressure sensor may detect pressure of the touch.

If a touch input is provided to the touch sensor 142, signal (s) corresponding to the touch may be transferred to a touch controller. The touch controller may process the signal(s) and then transfer the processed signal(s) to the controller 180. The controller 180 may determine whether a prescribed portion of the display 151 is touched.

The proximity sensor 141 may be provided to an internal area of the device 1135 enclosed by the touch screen and/or around the touch screen. The proximity sensor 141 may detect a presence or non-presence of an object approaching a prescribed detecting surface or an object existing around the proximity sensor 141 using an electromagnetic field strength or infrared ray without mechanical contact. The proximity sensor 141 may have longer durability than a contact type sensor and may also have a wider utility than the contact type sensor.

The proximity sensor 141 may include one of a transmittive photoelectric sensor, a direct reflective photoelectric sensor, a mirror reflective photoelectric sensor, a radio frequency oscillation proximity sensor, an electrostatic capacity proximity sensor, a magnetic proximity sensor, an infrared proximity sensor and the like. If the touch screen includes the electrostatic capacity proximity sensor, the proximity of a pointer may be detected using a variation of electric field according to proximity of the pointer. The touch screen (i.e., touch sensor) may be classified as the proximity sensor 141.

In the following description, an action that a pointer approaches without contacting the touch screen may be called a proximity touch. An action that a pointer actually touches the touch screen may be called a contact touch. The meaning of the position on the touch screen proximity-touched by the pointer may define a position of the pointer that vertically opposes the touch screen when the pointer performs the proximity touch.

The proximity sensor 141 may detect a proximity touch and a proximity touch pattern (e.g., a proximity touch distance, a proximity touch duration, a proximity touch position, a proximity touch shift state, etc.). Information corresponding to the detected proximity touch action and the detected proximity touch pattern may be outputted to the touch screen.

The audio output module 152 may function in various modes including a call-receiving mode, a call-placing mode, a recording mode, a voice recognition mode, a broadcast reception mode and/or the like to output audio data that is received from the wireless communication unit 110 or is stored in the memory 160. During operation, the audio output module 152 may output an audio signal relating to a particular function (e.g., a call received, a message received, etc.). The audio output module 152 may be implemented using one or more speakers, buzzers, other audio producing devices, and/or combinations thereof.

The alarm 153 may output a signal for announcing an occurrence of a particular event associated with the device 1135. Events may include a call received event, a message received event and a touch input received event. The alarm 153 may output a signal for announcing the event occurrence by way of vibration as well as video or audio signal. The video or audio signal may be outputted via the display 151 or the audio output unit 152. The display 151 or the audio output module 152 may be regarded as a part of the alarm 153.

The haptic module 154 may generate various tactile effects that can be sensed by a user. Vibration may be a representative one of the tactile effects generated by the haptic module 154. Strength and pattern of the vibration generated by the haptic module 154 may be controllable. For example, different vibrations may be outputted by being combined (or synthesized) together or may be outputted in sequence.

The haptic module 154 may generate various tactile effects as well as vibrations. For example, the haptic module 154 may generate an effect attributed to the arrangement of pins vertically moving against a contact skin surface, an effect attributed to injection/suction power of air through an injection/suction hole, an effect attributed to a skim over a skin surface, an effect attributed to a contact with an electrode, an effect attributed to an electrostatic force, an effect attributed to representation of warm/cold sense using an endothermic or exothermic device and/or the like.

The haptic module 154 may enable a user to sense a tactile effect through a muscle sense of a finger, an arm or the like as well as to transfer the tactile effect through a direct contact. At least two haptic modules 154 may be provided on the device 1135 based on a corresponding configuration type of the device 1135.

The memory 160 may store programs for operating the controller 180. The memory 160 may temporarily store input/output data such as phonebook data, message data, still image, vector list data 161, and/or moving image. Data for various patterns of vibration and/or sound outputted in case of a touch input to the touch screen may be stored in the memory 160.

The memory 160 may be implemented using any type or combination of suitable volatile and non-volatile memories or storage devices including a hard disk, a random access memory (RAM), a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk, a multimedia card micro type memory, a card-type memory (e.g., SD memory, XD memory, etc.) and/or other similar memory or data storage device. The device 1135 may operate in association with a web storage for performing a storage function of the memory 160 on the Internet.

The interface unit 170 may couple the device 1135 with external devices. The interface unit 170 may receive data from the external devices or may be supplied with power and then transfer the data or power to respective elements of the device 1135 or enable data within the device 1135 to be transferred to the external devices. The interface unit 170 may be configured using a wired/wireless headset port, an external charger port, a wired/wireless data port, a memory card port, a port for coupling to a device having an identity module, audio input/output ports, video input/output ports, an earphone port and/or the like.

The identity module may be a chip for storing various kinds of information for authenticating a use authority of the device 1135 and may include a User Identify Module (UIM), a Subscriber Identify Module (SIM), a Universal Subscriber Identity Module (USIM) and/or the like. A device having an identity module (hereafter called an identity device) may be manufactured as a smart card. The identity device may be connectible to the device 1135 via a relevant port.

When device 1135 is connected to an external cradle, the interface unit 170 may become a passage for supplying the device 1135 with power from the cradle or a passage for delivering various command signals inputted from the cradle by a user to the device 1135. Each of the various command signals inputted from the cradle or the power may operate as a signal enabling the device 1135 to recognize if it is correctly loaded in the cradle.

The controller 180 may control overall operations of the device 1135. For example, the controller 180 may perform control and processing associated with voice calls, data communications, video calls, etc. The controller 180 may include a central processing unit (CPU) 182 and a graphics processing using (GPU) 183 that may be configured as part of the controller 180, or may be implemented as separate components. The controller 180 may include a multimedia module 181 that provides multimedia playback. The multimedia module 181 may be configured as part of the controller 180, or may be implemented as a separate component. The controller 180 may perform a pattern recognizing process for recognizing a writing input or a picture drawing input carried out on the touch screen as characters or images, respectively.

The power supply unit 190 may provide a power required by various components of the device 1135. The power may be internal power, external power, and/or a combination thereof.

Embodiments may be implemented in a computer-readable medium using, for example, computer software, hardware, and/or some combination thereof. For hardware implementation, embodiments may be implemented using one or more applications of specific integrated circuits (ASICs), digital signal processors (DSPs), digital signal processing devices (DSPDs), programmable logic devices (PLDs), field programmable gate arrays (FPGAs), processors such as CPUs and GPUs, controllers, micro-controllers, microprocessors, other electronic units designed to perform functions described herein, and/or a selective combination thereof. Embodiments may also be implemented by or in conjunction with the controller 180.

Figure 3A:
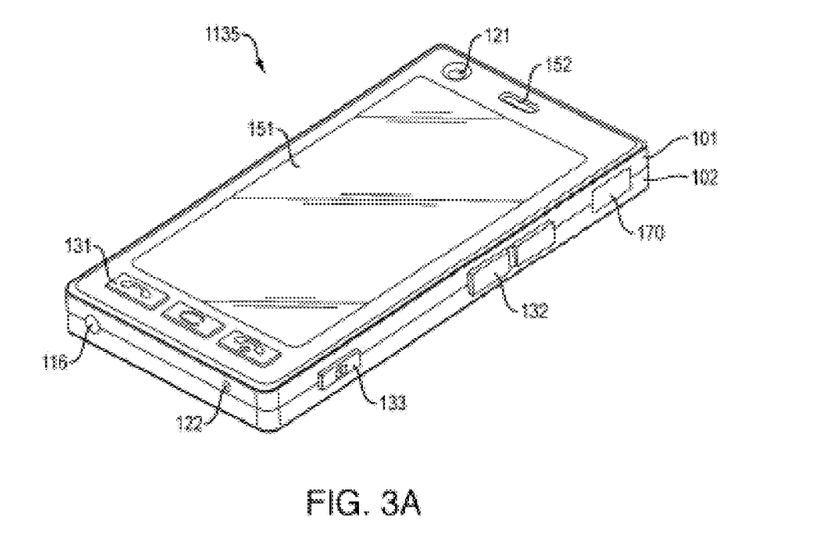
FIG. 3A is a perspective diagram of a front of the example device of FIG. 2.

For software implementation, embodiments may be implemented with separate software modules, such as procedures and functions, each of which may perform one or more of the functions and operations described herein. The software codes may be implemented with a software application written in any suitable programming language and may be stored in the memory 160, and executed by a controller or a processor, such as the controller 180.

recognizing mode of the display 151 and/or the like may be inputted to the second manipulating unit 132.

Figure 3B:
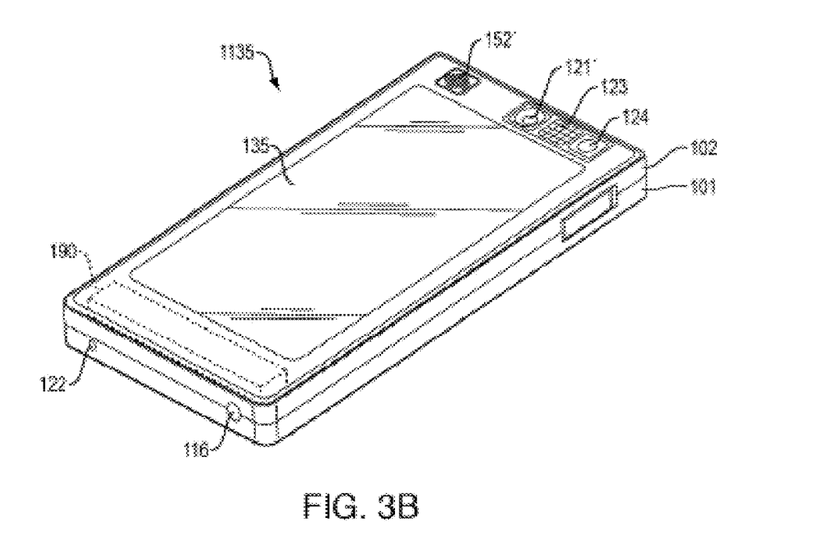
FIG. 3B is a perspective diagram of a backside of the example device of FIG. 2.

FIG. 3B is a perspective diagram of a backside of the device shown in FIG. 3A. Other embodiments, arrangements and configurations may also be provided.

As shown in FIG. 3B, a camera 121' may be additionally provided on a backside of the device body, and more particularly on the rear case 102. The camera 121' may have a photographing direction that is substantially opposite to a photographing direction of the camera 121 and may have pixels differing from pixels of the camera 121.

For example, the camera 121 may have a lower number of pixels to capture and transmit a picture of a user face for a video call, while the camera 121' may have a greater number of pixels for capturing a general subject for photography without transmitting the captured subject. Each of the cameras 121 and 121' may be provided on the device body to be rotated and/or popped up.

A flash 123 and a mirror 124 may be additionally provided adjacent to the camera 121'. The flash 123 may project light toward a subject in case of photographing the subject using the camera 121'. If a user attempts to take a picture of the user (i.e., self-photography) using the camera 121', the mirror 124 may enable the user to view a user face reflected by the mirror 124.

An additional audio output unit 152' may be provided on a backside of the device body. The additional audio output unit 152' may implement a stereo function together with the audio output unit 152 and may be used for implementation of a speakerphone mode in talking over the device 1135.

A broadcast signal receiving antenna 124 may be additionally provided at the lateral side of the device body as well as an antenna for communication or the like. The antenna 124 may be considered as a portion of the broadcast receiving module 111 and/or may be retractably provided on the device body.

The power supply unit 190 for supplying a power to the device 1135 may be provided with respect to the device body. The power supply unit 190 may be built within the device body. Alternatively, the power supply unit 190 may be detachably connected to the device body.

FIG. 3B also shows a touchpad 135 for detecting a touch that is additionally provided on the rear case 102. The touchpad 135 may be configured as a light transmittive type. If the display 151 outputs visual information from both faces, the display 151 may also recognize visual information via the touchpad 135. The information outputted from both of the faces may be controlled by the touchpad 135. Alternatively, a display may be further provided to the touchpad 135 so that a touchscreen may also be provided on the rear case 102.

The touchpad 135 may be activated by interconnecting with the display 151 of the front case 101. The touchpad 135 may be provided in rear of the display 151 and in parallel to one another. The touchpad 135 may have a size equal to or less than a size of the display 151.

Figure 4:
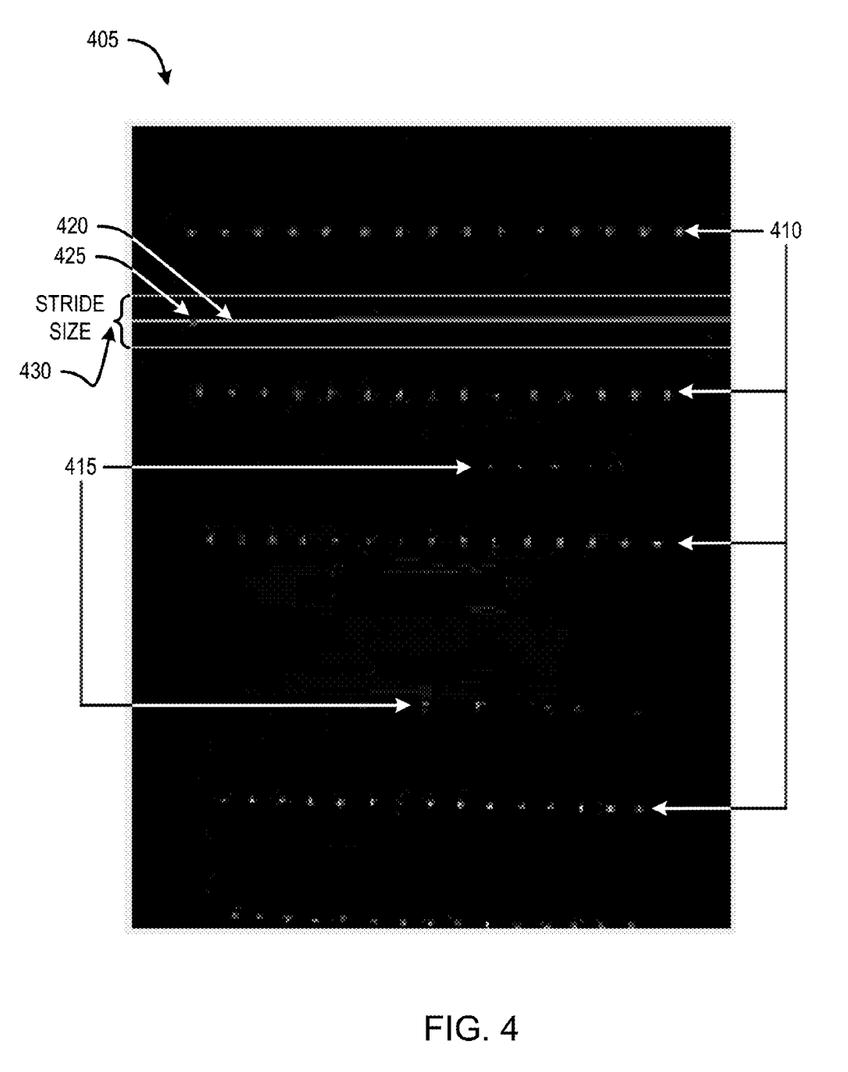
FIG. 4 is an illustration of a Hough transform as being applied to heatmap vectors.

FIG. 4 illustrates a heatmap 405 from which a list of vectors have been derived. As used herein, a vector is a complex structure that can be used to represent a marker, such as an LED, where the marker has a particular X-Y location in the heatmap and a particular radius that may be represented according to its pixel size. As such, an entire image or heatmap's worth of pixels can be represented using a small number of vectors, rather than storing data for every individual pixel. This feature substantially reduces the amount of information used in subsequent processing operations.

The heatmap 405 represents a captured image that has been processed where vectors associated with markers 410, 415 displaying particular characteristics (e.g., color) has been identified. A vectorization process can be applied to the heatmap to further process and refine marker identification to generate a vector list. The vector list includes information that represents marker characteristics, such as X-Y location within the heatmap and marker size information, such as marker diameter in pixels. Additional information relating to processing and deriving a list of vectors may be found in U.S. patent application Ser. No. 14/042,703, entitled "PROCESSING IMAGE DATA ASSOCIATED WITH IT SYSTEM COMPONENTS," filed concurrently herewith, which is incorporated herein by reference for all purposes.

Vector list information may be used to further analyze and refine marker information. At a high level, a stride size 430 is determined and vectors within the stride size boundary are identified and analyzed to determine if the vectors lie or are proximate to a line candidate 425. If, based on the pass-one results, a line candidate exists, the analysis process repeats incrementing one unit (e.g., a single pixel) at a time to identify any vectors that intersect with the line candidate 425. The results are stored and the process sets a new stride size location and repeats until all vectors have been processed. In this manner, markers 410 associated with vectors that represent a row, according to predefined criteria or policy, can be identified as such. However, vectors associated with markers 415 that are not sufficient to be identified as being on a line can be recognized as such. For example, markers that bleed thru and satisfy conditions to be identified as a marker are, nevertheless, not markers of interest in when identifying markers that lie on a line of interest. As such, the vectors associated with these markers 415 can be identified, filtered out or ignored.

Accordingly, the techniques described herein provide a system and method to utilize vector data to quickly detect a set of vectors that form a line. Such techniques are suitable for mobile devices used to capture and process images in real-time video. In example embodiments, a Hough algorithm may be implemented for line detection within a set of vectors derived from an image. One advantage of using the Hough algorithm is that it has a predictable number of calculations as compared to other algorithms that could take significantly longer to run with certain sets of input data.

With conventional methods, the Hough line algorithm is run on raw image data. The algorithm is trial and error based. It selects a range of slopes and offsets for lines to be tested to identify candidate lines. For each combination, a line is drawn across the image at a particular angle and location. The number of times the line goes through an edge is counted (where the pixel at a given point on the line is significantly different than the pixel before it). If the line candidate travels through enough edges, it can be considered to be a line. Running the Hough line algorithm on raw image data typically results in hundreds of thousands of calculation as each pixel multiplied by every potential location/orientation where a line could lie within the frame in an image needs to be is processed. Consequently, conventional methods employing the Hough line algorithm may require significant computing resources and/or processing time that can quickly overwhelm mobile computing devices.

Advantageously, employing techniques described herein, the number of computations required can be greatly reduced by using a pool of vectors instead of raw pixels. A collection of vectors is a much smaller set of data than the hundreds of thousand pixels in a raw image. Additionally, the type of information derived using this technique is much more useful in that it allows more complex computations such as deriving the distances between points or a point and a line as compared with conventional methods that merely determine if a point intersects a line.

Figure 5:
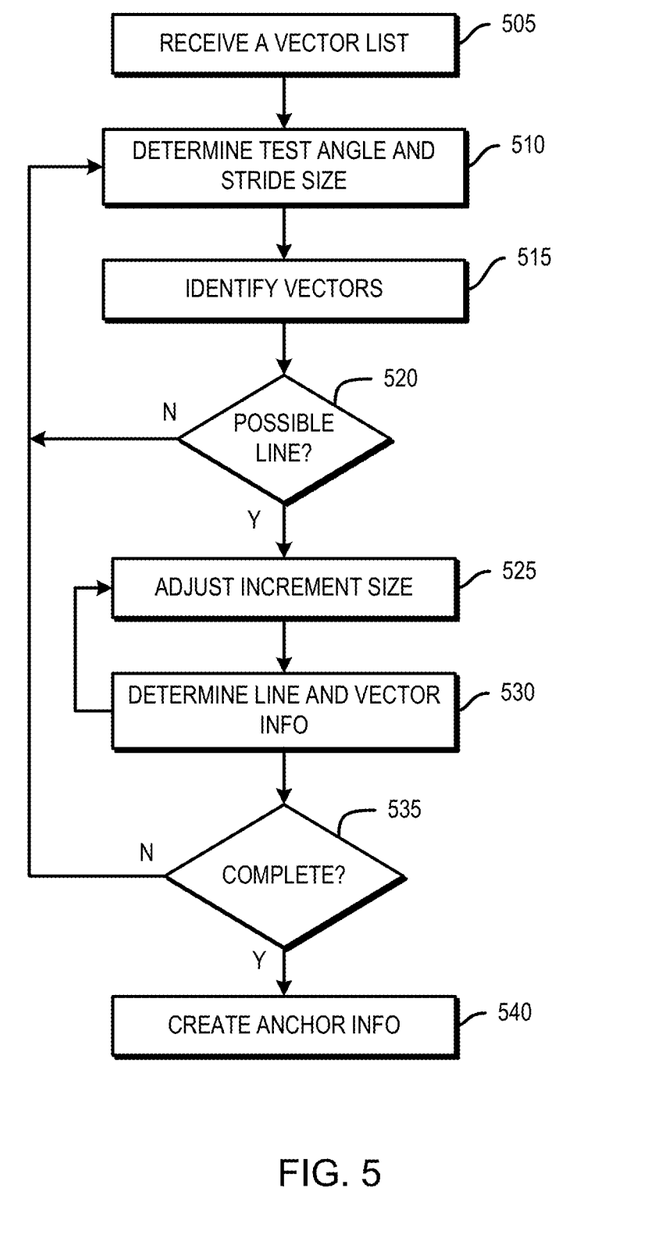
FIG. 5 a flowchart of a method for processing image data.

FIG. 5 is a flow diagram that illustrates an example method for use in processing vectorized elements associated with images of IT systems and/or components therein. While various methods disclosed herein are shown in relation to a flowchart or flowcharts, it should be noted that any ordering of method steps implied by such flowcharts or the description thereof is not to be construed as limiting the method to performing the steps, or sub-steps within or among the steps, in that order. Rather, the various steps of each of the methods disclosed herein can be performed in any of a variety of sequences. In addition, as the illustrated flowcharts are merely example embodiments, various other methods that include additional steps or include fewer steps than illustrated are also within the scope of the present invention.

As shown, the method can begin by receiving (or retrieving) a vector list 505. The method can be initiated manually by a user, for example, by clicking on a button or other object in a graphical user interface (GUI) on the mobile computing device or by entering a command in a command-line-interface. The method may also be called by a sub-method of one or more other methods. Execution of the method can also be based on various user-specified parameters. For example, a user can specify the number of frames per second at which a mobile computing device can capture an image. A user can also specify various settings such as test angle, stride size, increment size and the like.

Example embodiments of the technique may employ a modified version of the Hough algorithm that operates in a two-pass mode. The first-pass using a defined stride pulling from the global set of points, and the second-pass using one pixel increments using the pool of points qualified from the first-pass. For instance, at step 510, when operating in pass-one mode, a test angle and row stride size is selected. At step 515, the pool of vectors is checked to see if enough points are within the row stride distance such that there a line candidate that passes through a number of vectors. At step 520, if enough vectors are present, the method switches to a pass-two mode. At step 525, the method will increment by a particular value, such as one pixel at a time (instead of the row stride size) starting at the beginning of the row stride range and continue incrementing until the end of the stride size range is reached. At step 530, rather than compare the line against all vectors in the pool again, the method run second-pass mode analysis on the vectors originally found to be within a certain distance of the pass-one offset. In pass-two mode, the algorithm looks for actual intersection with the vectors rather than just proximity as is the case with pass-one mode.

The method will loop where the line gets incremented one pixel at a time. In this example, the pass-one mode is set to a stride size of 10 pixels, thus, in pass-two mode, the increment size will be one pixel at a time for a total of ten increment steps. At step 535, once the last pixel increment has been performed within that row stride range the method will return to step 510, switching back to pass-one mode and continue to increment by row stride size and test against the original pool of vectors. At step 540, an anchor list may be created that contains various anchor attributes derived for line vectors that have been determined to intersect a line according to a particular set of criteria or policies. Other anchor information may include location, distance between vectors, boundary values such as top or bottom row and left/right most vectors and the like.

In alternative example embodiments, continuous deduplication may be implemented during this process. For example, every time a line is detected in pass-two mode, it is compared against other lines previously detected. Each line contains vectors that belong to it. When comparing two lines, if both lines contain the same vectors then the line running more through the center of each vector is retained while the other line is discarded. When one line is a superset of the other line, then that line is retained while the subset is discarded. This check may be performed within the two-pass mode to discard as many duplicates as possible while permutating through a much smaller dataset, then again at the conclusion of each first-pass against all lines found during the first-pass process. This process can be repeated for each angle in the specified range.

Alternative example embodiments may further include performing fuzzy de-duplication on the data, after the above process completes. A grouping algorithm may search for clusters of lines that likely represent a single line. In this case, a stronger line may refer to a line that either contains a larger number of vectors or travels a longer distance inside of a vector.

The algorithm may begin with an empty set of group objects. A group object is a collection of lines that likely represent a single line. Each group has a "strongest" line stored, which can be used as the assumed actual location of the line represented by the group.

An algorithm is run on each line not assigned to a group until the pool of unassigned lines is empty. For example, a line is taken from the pool of unassigned lines and compared to each existing group to see if its slope and location is within a certain proximity to that group's strongest line. If the line is not close enough to any existing groups then a new group is created and the line is set as that group's strongest line (this is automatically the case for the first line since no groups yet exist). If a line matches an existing object then its strength is compared to the group's existing strongest line. If it is not stronger than the existing strongest line, it is added to the group's collection of secondary lines. If the new line is stronger, it is set as the group's strongest line and the previously strongest line is demoted to the pool of secondary lines. Each line in the secondary pool can now have their proximity conditions rechecked against the location parameters of the new strongest line. Any lines that now fail to meet the proximity conditions are returned to the pool of unassigned lines.

After this process, each Hough line group may be flattened into one line object. Each vector that was a member of one of the group's lines becomes a member of a new final line that inherits the location parameter of the strongest line. Each vector may now be stored in a data structure instead of being stored as pointers to the general pool of vectors. The average distance between two adjacent points on the line determines the scale of the line (e.g., how far away the object is from the camera lens). From that scale, any gaps where missing vectors would be expected can be filled in.

In an alternative example embodiment, before the first-pass begins, the incoming circle-points can be sorted into a fixed group of buckets based on their location. This speeds up the process so that distance calculations don't have to be performed on the complete set of vectors. The first-pass code only reads from pools that might have vectors that could potentially be within distance of the row stride boundaries.

In other alternative example embodiments, a dynamic N-pass technique may be implemented. For example, the current 2-pass system above can be described as an instance of an N-pass system as [10, 1], with 10 being the stride size, and 1 being the increment size used in the first-pass. The dynamic N-pass technique can be implemented in a binary divide and conquer fashion, such as [64, 32, 16, 8, 4, 2, 1]. Thus, in step 510, a stride size of 64 pixels may be selected (e.g., $2^n$ where n=6). At steps 525, 530, the method can loop, decrementing n by 1 for each loop until n=0. In other words, the increment size would be set to $2^{n-1}$ for a 32 pixel stride size and it would use the vector pool resulting from the 64 pixel stride. Then the increment size would be set to a 16 pixel stride and it would use the vector pool resulting from the 32 pixel stride. The increment size is then set to an 8 pixel stride and it would use the vector pool from the 16 pixel stride, and so on. Advantageously, this technique can minimize the number of overall lines that need to be tested, as well as the average number of points in the vector pool per test. Lines may also be deduplicated at as low a level as possible, further reducing the permutation calculations for deduplications. By constantly reducing the number of points in the pool at each level, pre-bucketing points as described in the static implementation may no longer be necessary.

Figure 6:
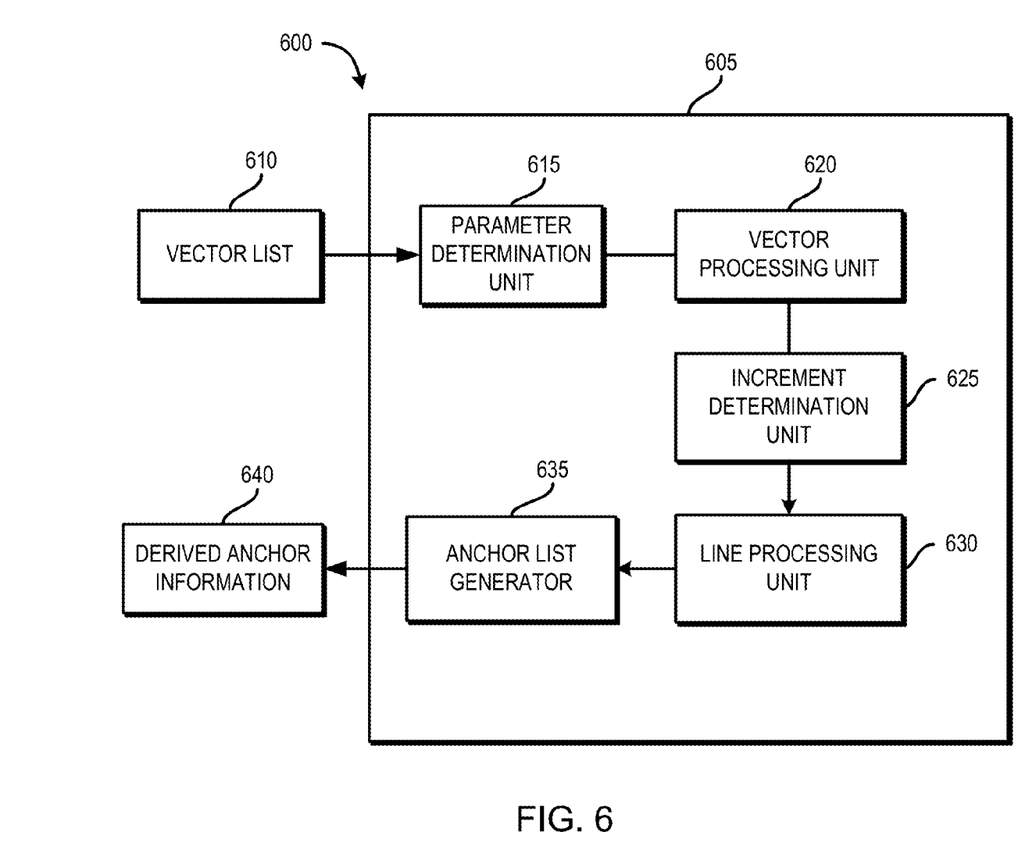
FIG. 6 is a block diagram of a determination module of a mobile computing device.

FIG. 6 illustrates a system 600 configured to process vectorized elements associated with IT components. The system 600 may receive or retrieve a vector list 610 comprising a list of vectors that represent markers of interest derived from heatmap data. The vector list 610 may be received by a receiver (not shown) or retrieved by a system interface or adapter (not shown). The vector list 610 may be stored locally or stored elsewhere and retrieved wirelessly using any known protocol. Such a vector list 610 may be derived from image data corresponding to an image of IT components captured using a mobile computing device camera. The system 600 may include an anchor processing unit 605 that comprises a parameter determination unit 615, vector processing unit 620, increment determination unit 625, line processing unit 630, and anchor list generator 635.

The parameter determination unit 615 may be configured to determine a line test angle and stride size. The anchor processing unit 605 may be placed in a pass-one mode where the stride size can be a static value or a dynamic value (e.g., $2^n$) that can be successively reduced (e.g., by half) as was described above. The vector processing unit 620 may identify vectors that are located with a boundary as determined by the chosen stride size. If the processing unit 605 determines there are enough proximity vectors, there may be a line that passes through a predetermined number of vectors. If so, the method switches to pass-two mode. The increment determination unit 625 may be configured to select an increment value so as identify a line that passes through the center of a vector. For example, in static mode the value may be as few as one pixel. In dynamic mode, the value may be $2^{n-1}$. Also, in this mode, vectors for consideration may be limited to vectors identified during the previous processing cycle. That is, for static mode, the pass-one vectors are used and for dynamic mode, the vectors identified during the previous processing sequence ($2^{n+1}$ stride size) are used. Processing control may loop between the vector processing unit 620, increment determination unit 625, and line processing unit 630 until the vector and line analysis completes. The anchor list generator may create a list of anchor points based on the processing and analysis results. Other information may be created such as the distance between vectors, positional identification (e.g., bottom, top, left, right) information and the like.

It should again be emphasized that the technique implementations described above are provided by way of illustration, and should not be construed as limiting the present invention to any specific embodiment or group of embodiments. For example, the invention can be implemented in other types of systems, using different arrangements of processing devices and processing operations. Also, message formats and communication protocols utilized may be varied in alternative embodiments. Moreover, various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

Furthermore, as will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A method executed on a mobile computing device for processing vectorized elements, the method comprising:
   receiving a vector list, wherein the list comprises a set of vectors having positional and magnitude values associated with identified markers;
   determining a first test angle and first row stride size;
   analyzing vectors falling within a boundary defined by the first test angle and first row stride size and determining a likelihood the vectors form a line;
   if a positive determination result, adjusting an increment size;
   identifying vectors that intersect with a line, wherein the vectors include vectors determined to fall with the boundary defined by the first test angle and first row stride size;
   based on a first policy, identifying vectors that intersect the line; and
   creating a report including anchor information associated with the identified vectors.

2. A system for use in analyzing image data associated with storage systems, the system comprising:
   a receiving unit configured to receive a vector list, wherein the list comprises a set of vectors having positional and magnitude values associated with identified markers;
   a parameter determination unit configured to determine a first test angle and first row stride size;
   a vector processing unit configured to process vectors falling within a boundary defined by the first test angle and first row stride size and determining a likelihood the vectors form a line;
   an increment determination unit configured to determine and an increment size;
   a line processing unit configured to identify vectors that intersect with a line, wherein the vectors include vectors determined to fall with the boundary defined by the first test angle and first row stride size;
   based on a first policy, configuring the line processing unit to identify vectors that intersect the line; and
   an anchor list generator configured to generate a report including anchor information associated with the identified vectors.

* * * * *